United States Patent
Riffe et al.

(10) Patent No.: US 11,254,273 B2
(45) Date of Patent: Feb. 22, 2022

(54) VENTING OF AIRBAG FOR ADJUSTMENT OF CUSHIONING SURFACE POSITION

(71) Applicant: Toyota Motor Engineering & Manufacturing North America, Inc., Plano, TX (US)

(72) Inventors: Jessica A. Riffe, Ann Arbor, MI (US); Nathaniel P. Jordan, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 120 days.

(21) Appl. No.: 16/165,394

(22) Filed: Oct. 19, 2018

(65) Prior Publication Data
US 2020/0122666 A1    Apr. 23, 2020

(51) Int. Cl.
*B60R 21/02* (2006.01)
*B60R 21/239* (2006.01)

(52) U.S. Cl.
CPC ............ *B60R 21/02* (2013.01); *B60R 21/239* (2013.01); *B60R 2021/0273* (2013.01); *B60R 2021/0293* (2013.01); *B60R 2021/2395* (2013.01)

(58) Field of Classification Search
CPC ................. B60R 21/02; B60R 21/239; B60R 2021/2395; B60R 2021/0273; B60R 2021/0293; B60R 2021/23348
See application file for complete search history.

(56) References Cited

U.S. PATENT DOCUMENTS

| | | | | |
|---|---|---|---|---|
| 3,476,402 A | * | 11/1969 | Karl | B60R 21/233 280/729 |
| 5,492,363 A | * | 2/1996 | Hartmeyer | B60R 21/239 280/738 |
| 5,507,521 A | * | 4/1996 | Steffens, Jr. | B60R 21/203 180/282 |
| 5,967,545 A | | 10/1999 | Iijima et al. | |
| 6,139,048 A | * | 10/2000 | Braunschadel | B60R 21/2338 280/728.1 |
| 6,315,323 B1 | * | 11/2001 | Pack, Jr. | B60R 21/233 280/735 |
| 6,398,258 B2 | * | 6/2002 | Hamada | B60R 21/2171 280/739 |
| 6,616,182 B2 | * | 9/2003 | Woolley | B60R 21/205 280/728.2 |
| 6,752,420 B2 | | 6/2004 | Ziolo et al. | |
| 6,832,778 B2 | * | 12/2004 | Pinsenschaum | B60R 21/239 280/739 |
| 6,945,559 B2 | * | 9/2005 | Kassman | B60R 21/239 280/735 |

(Continued)

*Primary Examiner* — Paul N Dickson
*Assistant Examiner* — Timothy Wilhelm
(74) *Attorney, Agent, or Firm* — Christopher G. Darrow; Darrow Mustafa PC

(57) ABSTRACT

A vehicle airbag system includes an airbag having a cushioning surface configured to be contacted by a user to cushion the user after inflation of the airbag. The airbag also includes at least one cushioning surface positioning vent coupled to the cushioning surface. The at least one cushioning surface positioning vent is actuatable to direct a flow of gas exiting an interior of the airbag so as to produce a reaction force which moves the cushioning surface in a predetermined direction.

15 Claims, 8 Drawing Sheets

(56) References Cited

U.S. PATENT DOCUMENTS

| | | | |
|---|---|---|---|
| 7,204,514 B2* | 4/2007 | Kanuma | B60R 21/231 280/743.1 |
| 7,210,702 B2* | 5/2007 | Soderquist | B60R 21/233 280/740 |
| 7,328,915 B2* | 2/2008 | Smith | B60R 21/2338 280/739 |
| 7,347,450 B2* | 3/2008 | Williams | B60R 21/2338 280/739 |
| 7,413,218 B2* | 8/2008 | Ekdahl | B60R 21/239 280/736 |
| 7,600,782 B2* | 10/2009 | Ishiguro | B60R 21/239 280/739 |
| 7,607,689 B2* | 10/2009 | Kalczynski | B60R 21/2338 280/739 |
| 7,614,654 B2* | 11/2009 | Williams | B60R 21/2338 280/743.1 |
| 7,628,422 B2* | 12/2009 | Fukawatase | B60R 21/2338 280/739 |
| 7,648,166 B2* | 1/2010 | Maripudi | B60R 21/233 280/740 |
| 7,651,130 B2* | 1/2010 | Bauberger | B60R 21/239 280/743.2 |
| 7,770,926 B2* | 8/2010 | Schneider | B60R 21/239 280/743.2 |
| 7,810,841 B2* | 10/2010 | Fukawatase | B60R 21/239 280/739 |
| 7,845,678 B2* | 12/2010 | Pausch | B60R 21/2338 280/735 |
| 7,874,576 B2* | 1/2011 | Gandhi | B60R 21/203 280/728.2 |
| 7,878,538 B2* | 2/2011 | Abe | B60R 21/2338 280/739 |
| 7,938,444 B2* | 5/2011 | Williams | B60R 21/2338 280/743.2 |
| 7,938,445 B2* | 5/2011 | Smith | B60R 21/2338 280/743.2 |
| 7,946,618 B2* | 5/2011 | Fukawatase | B60R 21/239 280/739 |
| 7,954,850 B2 | 6/2011 | Fischer et al. | |
| 8,061,734 B2* | 11/2011 | Parks | B60R 21/2346 280/739 |
| 8,191,925 B2* | 6/2012 | Williams | B60R 21/239 280/739 |
| 8,226,118 B2* | 7/2012 | Rose | B60R 21/2338 280/743.2 |
| 8,342,570 B2* | 1/2013 | Higuchi | B60R 21/239 280/739 |
| 8,388,021 B2* | 3/2013 | Mitsuo | B60R 21/239 280/743.2 |
| 8,414,023 B2* | 4/2013 | Naganawa | B60R 21/239 280/743.2 |
| 8,491,004 B2* | 7/2013 | Mendez | B60R 21/2338 280/739 |
| 8,505,970 B2* | 8/2013 | Kim | B60R 21/205 280/743.2 |
| 8,646,808 B2* | 2/2014 | Williams | B60R 21/239 280/743.2 |
| 8,955,878 B2* | 2/2015 | Jang | B60R 21/239 280/736 |
| 9,016,721 B1* | 4/2015 | Potter | B60R 21/239 280/739 |
| 9,033,362 B2* | 5/2015 | Fukawatase | B60R 21/239 280/728.2 |
| 9,079,559 B2* | 7/2015 | Iwamoto | B60R 21/2338 |
| 9,187,058 B2* | 11/2015 | Yamaji | B60R 21/239 |
| 9,199,601 B2* | 12/2015 | Yamaji | B60R 21/2334 |
| 9,296,360 B2* | 3/2016 | Komamura | B60R 21/0136 |
| 9,376,086 B2* | 6/2016 | Nebel | B60R 21/239 |
| 9,499,118 B2* | 11/2016 | Jindal | B60R 21/206 |
| 9,550,465 B1* | 1/2017 | EL-Jawahri | B60R 21/26 |
| 9,573,555 B2* | 2/2017 | Jang | B60R 21/2338 |
| 9,580,039 B2* | 2/2017 | Schneider | B60R 21/233 |
| 9,663,054 B2* | 5/2017 | Kruse | B62D 1/11 |
| 9,676,363 B1* | 6/2017 | Deng | B60R 21/233 |
| 9,676,364 B2* | 6/2017 | Williams | B60R 21/2338 |
| 9,731,678 B2* | 8/2017 | Kim | B60R 21/239 |
| 9,758,124 B2* | 9/2017 | Kruse | B60R 21/2338 |
| 9,821,746 B1* | 11/2017 | O'Connor | B60R 21/205 |
| 9,845,067 B2* | 12/2017 | Morris | B60R 21/239 |
| 9,845,069 B1* | 12/2017 | Owen | B60R 21/205 |
| 9,873,402 B2* | 1/2018 | Saito | B60R 21/239 |
| 9,908,496 B2* | 3/2018 | Choi | B60R 21/231 |
| 9,994,178 B2* | 6/2018 | Paxton | B60R 21/203 |
| 10,501,041 B2* | 12/2019 | Faruque | B60R 21/217 |
| 10,513,206 B2* | 12/2019 | Spahn | B60N 2/4207 |
| 10,730,472 B2* | 8/2020 | Perez | B60R 21/205 |
| 10,737,648 B2* | 8/2020 | Nagasawa | B60R 21/203 |
| 10,793,098 B2* | 10/2020 | Malapati | B60R 21/203 |
| 10,821,930 B2* | 11/2020 | Malapati | B60R 21/0136 |
| 10,864,876 B2* | 12/2020 | Malapati | B60R 21/205 |
| 2003/0209895 A1* | 11/2003 | Gu | B60R 21/239 280/739 |
| 2004/0012179 A1* | 1/2004 | Pinsenschaum | B60R 21/239 280/739 |
| 2005/0057027 A1* | 3/2005 | Fogle, Jr. | B60R 21/276 280/739 |
| 2006/0071462 A1* | 4/2006 | Smith | B60R 21/2338 280/739 |
| 2006/0202454 A1* | 9/2006 | Parizal | B60R 21/264 280/735 |
| 2006/0284404 A1* | 12/2006 | Green | B60R 21/231 280/743.2 |
| 2007/0052222 A1* | 3/2007 | Higuchi | B60R 21/233 280/738 |
| 2009/0033081 A1* | 2/2009 | Flischer | B60R 21/2338 280/743.2 |
| 2009/0236837 A1* | 9/2009 | Fukawatase | B60R 21/239 280/739 |
| 2009/0289444 A1* | 11/2009 | Keshavaraj | B60R 21/239 280/736 |
| 2010/0133798 A1* | 6/2010 | Fukawatase | B60R 21/2338 280/743.2 |
| 2011/0309605 A1* | 12/2011 | Kumagai | B60R 21/239 280/741 |
| 2013/0147171 A1* | 6/2013 | Shin | B60R 21/239 280/743.2 |
| 2014/0175778 A1* | 6/2014 | Choi | B60R 21/239 280/743.2 |
| 2014/0375032 A1* | 12/2014 | Fukawatase | B60R 21/239 280/729 |
| 2015/0014969 A1* | 1/2015 | Choi | B60R 21/239 280/730.1 |
| 2015/0054267 A1* | 2/2015 | Komamura | B60R 21/0136 280/735 |
| 2016/0250993 A1* | 9/2016 | Nagatani | B60R 21/203 280/730.1 |
| 2016/0311392 A1* | 10/2016 | Jindal | B60R 21/01512 |
| 2017/0096118 A1* | 4/2017 | Kruse | B60R 21/203 |
| 2018/0079383 A1* | 3/2018 | O'Connor | B60R 21/2338 |
| 2018/0281742 A1* | 10/2018 | Komatsu | B60R 21/239 |
| 2020/0055482 A1* | 2/2020 | Valles | B60R 21/272 |

* cited by examiner

FIG. 3A
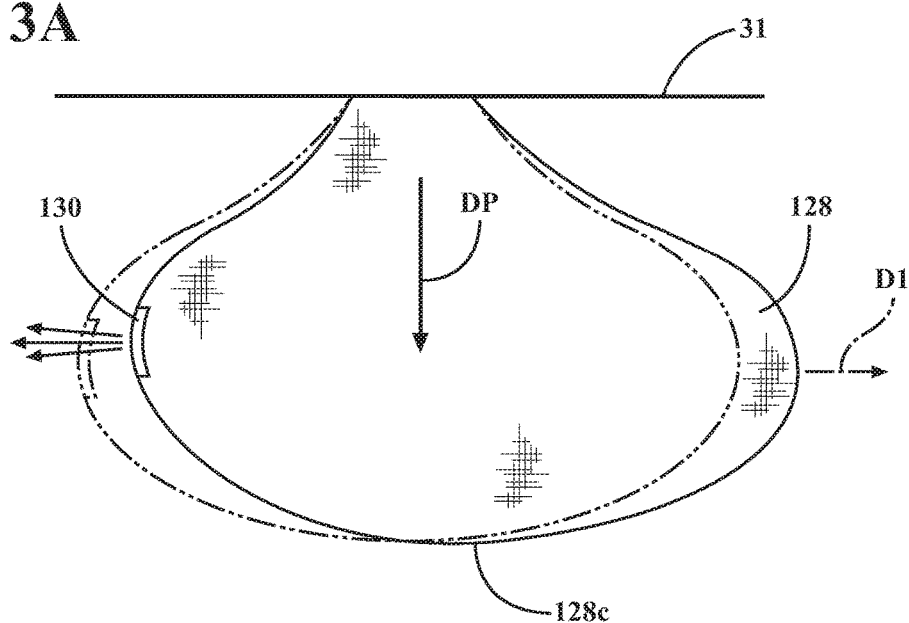
FIG. 3B
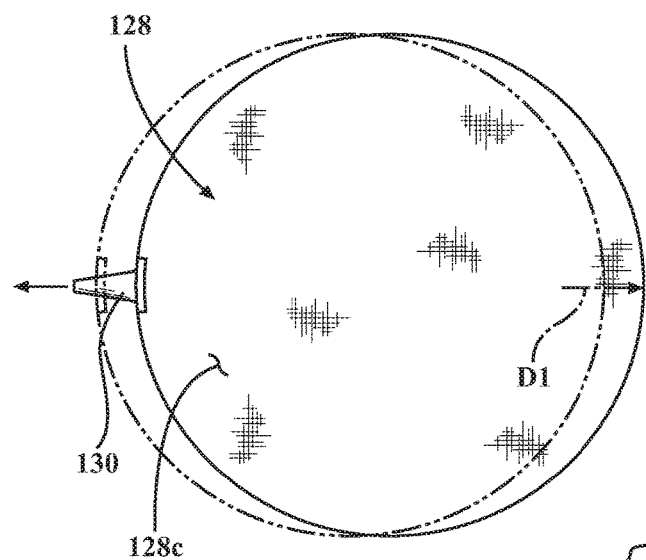
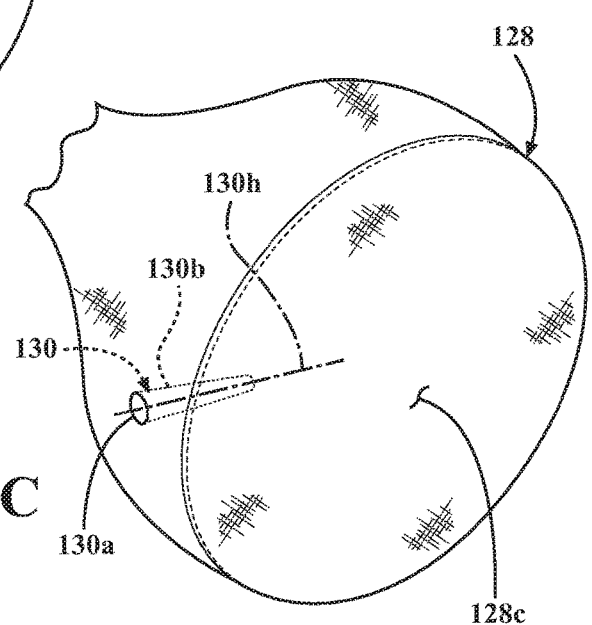
FIG. 3C

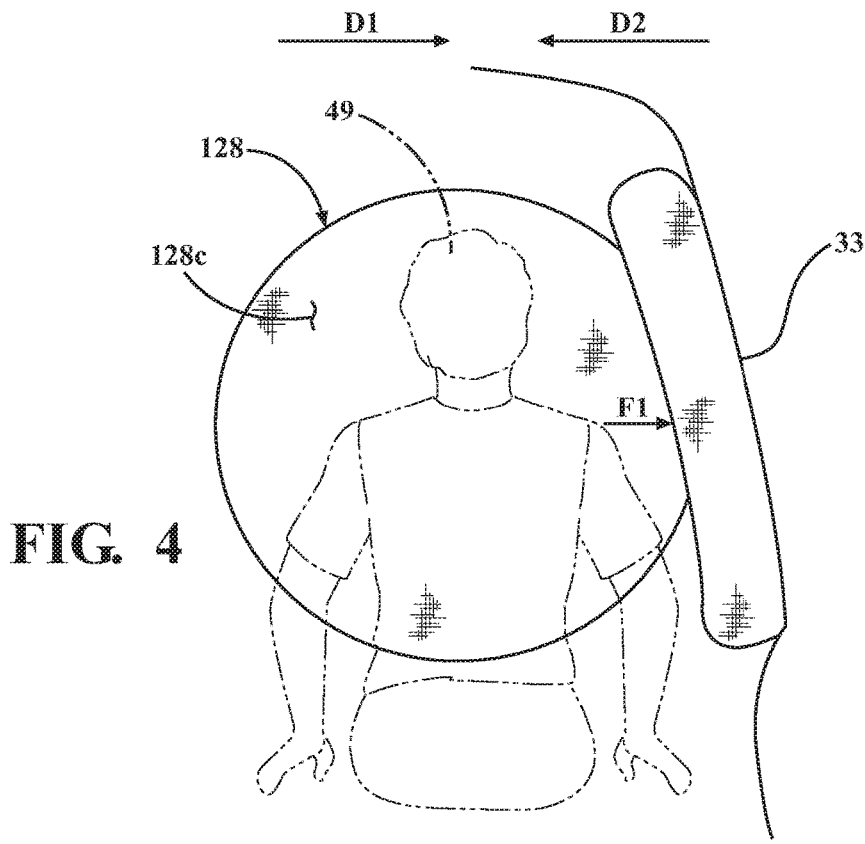
FIG. 4
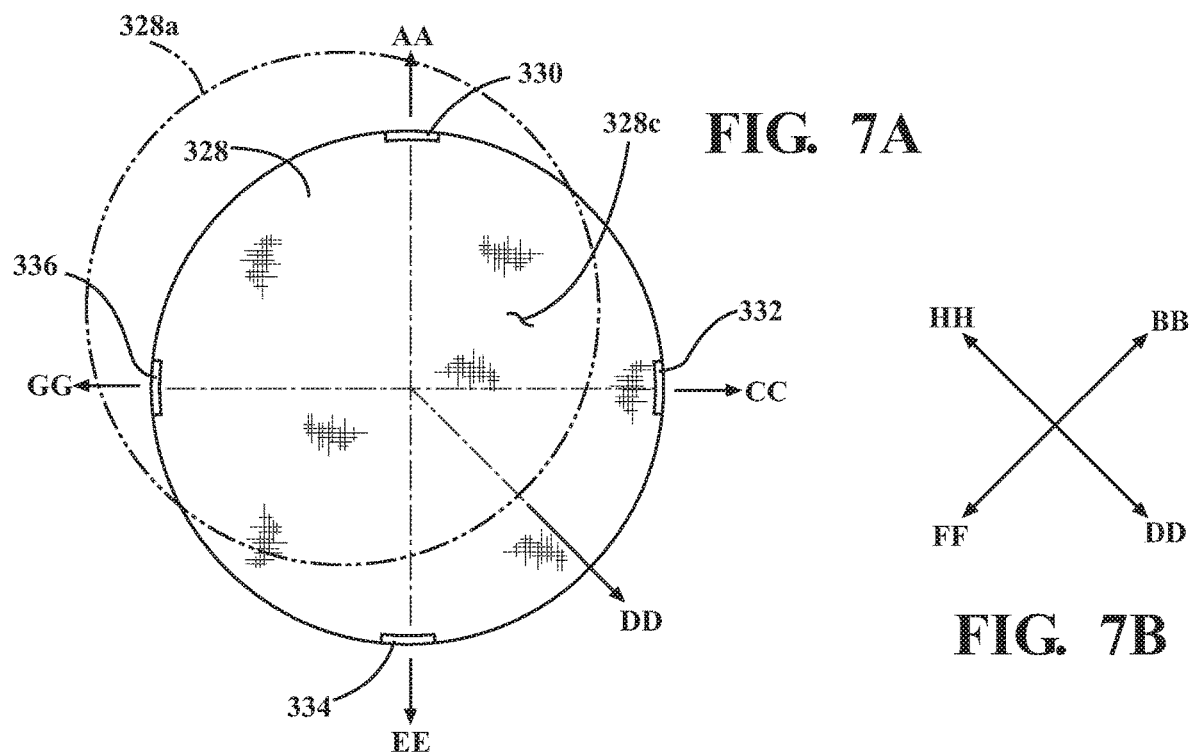
FIG. 7A
FIG. 7B

VENTING OF AIRBAG FOR ADJUSTMENT OF CUSHIONING SURFACE POSITION

TECHNICAL FIELD

The present disclosure relates to vehicle airbags and, more particularly, to mechanisms for moving or adjusting the position of a cushioning surface of an airbag to align with a vehicle occupant.

BACKGROUND

In certain types of vehicle collisions, the resulting movement of a vehicle occupant may cause the occupant to move outside an optimal deployment zone of a vehicle airbag. For example, in oblique collision scenarios, momentum of the occupant in one direction may cause the occupant to continue to move in that direction after the collision. Also, due to the vehicle turning or rotating as a result of the collision, the occupant movement direction may no longer align with a deployment direction of a vehicle airbag design to cushion the occupant in the event of a straight, head-on collision. In this case, the airbag may fail to properly cushion the occupant.

SUMMARY OF THE INVENTION

In one aspect of the embodiments described herein, a vehicle airbag system is provided. The airbag system has an airbag including a cushioning surface configured to be contacted by a user to cushion the user after inflation of the airbag. The system also includes at least one cushioning surface positioning vent coupled to the cushioning surface. The at least one cushioning surface positioning vent is actuatable to direct a flow of gas exiting an interior of the airbag so as to produce a reaction force which moves the cushioning surface in a predetermined direction.

In another aspect of the embodiments described herein, an airbag includes a cushioning surface configured to be contacted by a user to cushion the user after inflation of the airbag. The airbag also includes at least one actuatable cushioning surface positioning vent coupled to the cushioning surface. The at least one cushioning surface positioning vent is configured to direct a flow of gas exiting an interior of the airbag so as to produce a reaction force which moves the cushioning surface to a predetermined location prior to contact of the user with the cushioning surface.

In another aspect of the embodiments described herein, method of moving a cushioning surface of an airbag in a predetermined direction after inflation of the airbag is provided. The method includes a step of providing an airbag including at least one cushioning surface positioning vent coupled to the cushioning surface, the at least one cushioning surface positioning vent being actuatable to direct a flow of gas exiting an interior of the airbag so as to produce a reaction force which moves the cushioning surface in a predetermined direction. The method also includes a step of, responsive to a control signal, actuating the at least one cushioning surface positioning vent so as to produce the reaction force which moves the cushioning surface in the predetermined direction.

BRIEF DESCRIPTION OF THE DRAWINGS

The accompanying drawings, which are incorporated in and constitute a part of this specification, illustrate embodiments described herein and together with the description serve to explain principles of embodiments described herein.

FIG. 3A is a schematic plan view of an airbag in accordance with another embodiment described herein, shown in a deployed or fully inflated state and after actuation of a cushioning surface positioning vent.

FIG. 3B is a schematic frontal view of the inflated airbag shown in FIG. 3A.

FIG. 3C is a side perspective view of the inflated airbag shown in FIGS. 3A and 3B, prior to actuation of the cushioning surface positioning vent.

FIG. 4 is a schematic frontal view of the airbag shown in FIGS. 3A-3C after actuation of the cushioning surface positioning vent, showing a particular application of the airbag.

FIG. 7A is a schematic front view of an airbag in accordance with another embodiment described herein, and showing movement of the airbag cushioning surface after actuation of a pair of cushioning surface positioning vents.

FIG. 7B shows directions of reaction forces provided by gas flow from the cushioning surface positioning vents shown in FIG. 7A.

DETAILED DESCRIPTION

Figure 1A:
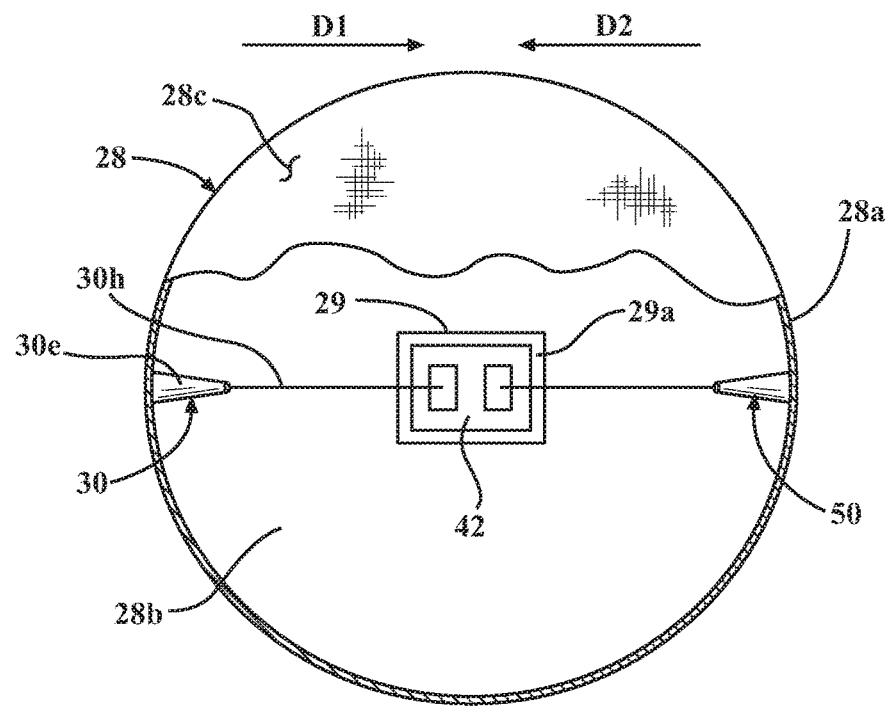
FIG. 1A is a schematic partial cutaway frontal view of an airbag in accordance with an embodiment described herein, shown in an inflated condition and prior to actuation of cushioning surface positioning vents.

In one or more arrangements described herein, a vehicle airbag system includes an airbag having a cushioning surface configured to be contacted by a user to cushion the user after inflation of the airbag. The airbag also includes at least one cushioning surface positioning vent coupled to the cushioning surface. The cushioning surface positioning vent(s) may be individually actuated according to the characteristics of a given collision scenario. The characteristics of a given collision scenario may be detected by sensors. Each vent is actuatable to direct a flow of gas exiting an interior of the airbag so as to produce an associated reaction force which moves the cushioning surface in an associated predetermined direction. The vent(s) are designed to move the cushioning surface into better alignment with an anticipated post-collision line of motion of a vehicle occupant, so that the cushioning surface will be in a better position for contact with the occupant in a given crash scenario.

In the various embodiments described herein, similar elements of different embodiments may have similar reference characters, except where noted. Thus, for example, the reference numeral "28c" is used to designate the airbag cushioning surface in FIGS. 1A-1C, while the reference numeral "228c" is used to designate the airbag cushioning surface in FIGS. 6A-6C. Also, as referred to herein, a vehicle fore-aft axis may be defined as an axis extending along a vertical plane passing through a center of mass of a vehicle, and parallel to a road surface on which the vehicle resides. The vehicle fore-aft axis indicates reference forward and reverse directions of the vehicle when the vehicle wheels are straight (pointed at a 0° turning angle). Also, the terms "left side", "left direction", "right side", "right direction", "upward direction" and "downward direction" are referenced from the perspective of a of a vehicle occupant seated in a vehicle seat and facing toward the front of the vehicle in a direction parallel to the vehicle fore-aft axis. In addition, although the inflated airbag shapes shown in the drawings may be simplified for purposes of describing the operating principles set forth herein, an embodiment of an airbag described herein may have any of a variety of actual inflated shapes.

Figure 1B:
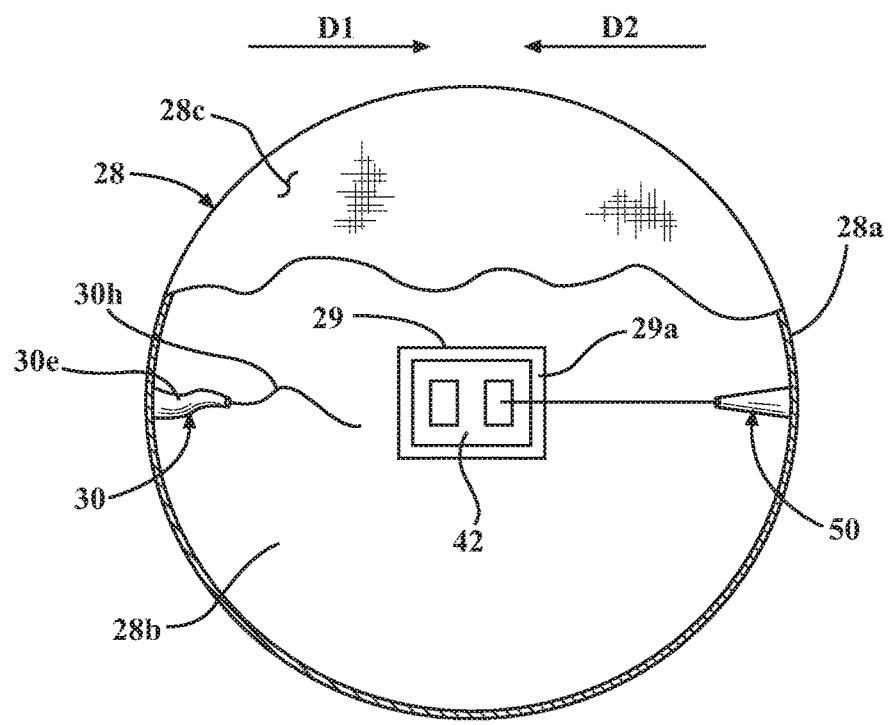
FIG. 1B shows the airbag of FIG. 1A immediately after actuation of a cushioning surface positioning vent, after a flow director securement mechanism has released a cable securing a flow director within the airbag interior.
Figure 1C:
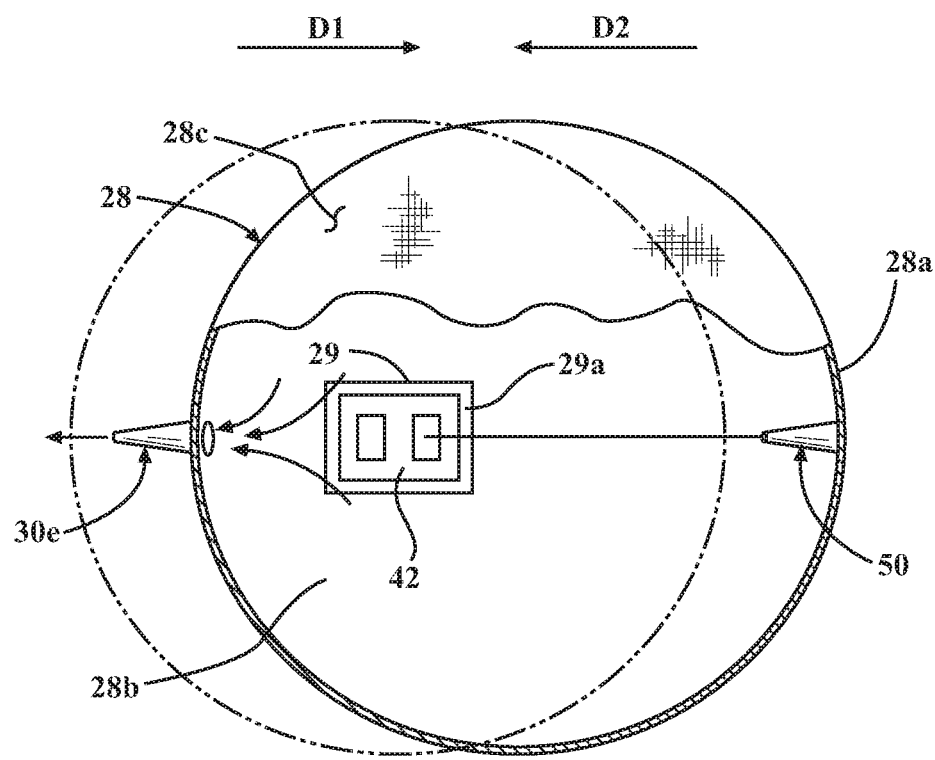
FIG. 1C shows the airbag of FIGS. 1A and 1B after the flow director has been forced out of the airbag interior through a vent opening, to direct a flow of gas from the airbag interior.

FIGS. 1A-1C are schematic views showing an airbag 28 in accordance with an embodiment described herein. In one or more arrangements, the airbag 28 may be incorporated into a vehicle. The vehicle may be any type of vehicle (for example, an SUV, sedan, truck, boat, etc.). The airbag 28 may be deployable so as to be interposable between a vehicle occupant (not shown) and a portion of the vehicle to cushion the occupant in a collision scenario, for example. FIG. 1A is a front partial cutaway view (i.e., a view a seated vehicle occupant would have when facing the deployed airbag) showing the airbag 28 in a deployed or fully inflated state, and also showing a portion of the interior of the airbag.

The airbag 28 may have an outer shell 28a defining an interior 28b of the airbag. In the event of a collision, inflation gases may flow into the airbag interior 28b to inflate the airbag 28 in a known manner. Airbag 28 may be formed from any material or materials which are foldable, substantially gas-tight, and otherwise suitable for the purposes described herein. An airbag as described herein may be any of various types of airbags configured for vehicle occupant protection. Such an airbag may be positioned in any of a variety of locations within the vehicle, and may comprise a front seat driver or passenger airbag, a side curtain airbag, a rear seat passenger airbag, or any other type of airbag.

Referring to FIGS. 1A-1C, the airbag 28 may include a cushioning surface 28c configured to be contacted by a user (i.e., in a vehicle application, a vehicle occupant) to cushion the user after inflation of the airbag 28. As used herein, a "cushioning surface" of an airbag may be defined as a surface configured for contact with a vehicle occupant after inflation of the airbag, to cushion the occupant in the event of a collision, for example. The airbag 28 may also include at least one cushioning surface positioning vent (generally designated 30) coupled to the cushioning surface 28c. In a manner described herein, the at least one cushioning surface positioning vent 30 may be actuatable to direct a flow of gas exiting an interior of the airbag so as to produce a reaction force which moves the cushioning surface 28c in a predetermined direction.

Figure 2:
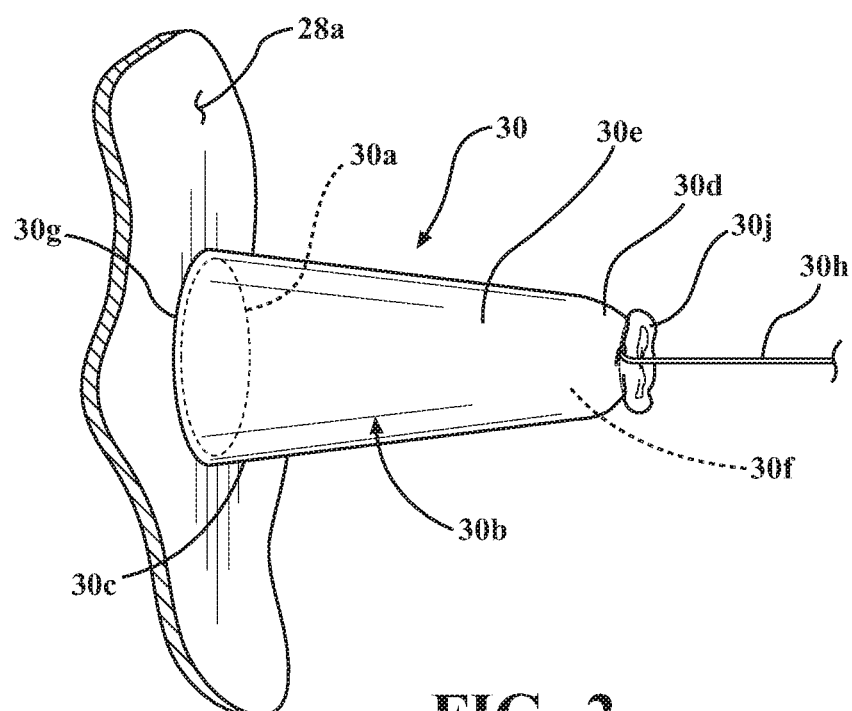
FIG. 2 is a schematic perspective view of a cushioning surface positioning vent in accordance with an embodiment described herein and prior to actuation of the vent.

An actuatable cushioning surface positioning vent as described herein may have any structure suitable for the purposes described herein. FIG. 2 is a schematic perspective view of one embodiment of a cushioning surface positioning vent 30 useable in the airbag embodiment shown in FIGS. 1A-1C, and also for other airbag embodiments described herein. Referring to FIG. 2, in one or more arrangements, the cushioning surface positioning vent 30 may include a vent opening 30a formed in the airbag outer shell 28a and structured to enable a flow of inflation gas from the airbag interior 28b to an exterior of the airbag (i.e., to the environment outside the airbag). The vent 30 may also include a flow director 30b structured to extend outside the airbag outer shell 28a after vent actuation to direct the flow of gas in another predetermined direction different from the predetermined direction in which the cushioning surface 28c is to be moved. Direction of the flow of gas in the other predetermined direction may produce the reaction force necessary to move the cushioning surface 28c.

FIG. 2 shows a flow director 30b in accordance with an embodiment described herein. In the embodiment shown, the flow director 30b includes a first end 30c, a second end 30d opposite the first end 30c, and a tubular body 30e extending between the first end 30c and the second end 30d. The body 30e defines an interior 30f of the flow director 30b. An edge 30g of the first end 30c may be coupled to the airbag outer shell 28a surrounding the vent opening 30a (using stitching, adhesive application, or any other suitable means) so as to form a substantially gas-tight seal between the flow director first end 30c and the airbag outer shell 28a. In one or more arrangements, the flow director 30b may have a sleeve-like shape, similar to a windsock.

Referring to FIGS. 1A-1C and 2, the flow director second end 30d may be releasably securable inside the airbag interior 28b prior to actuation of the cushioning surface vent 30. For example, in one arrangement, the flow director second end 30d may be secured to a flow director securement mechanism 42 using a cable or tether 30h connecting the flow director second end 30d to the securement mechanism 42. Other releasable securement arrangements may also be used. In one or more arrangements, the cable 30h may be formed from an elastic or otherwise stretchable material which may stretch when tensioned, while the cable ends are attached to the securement mechanism 42 and the flow director second end 30d. This may help accommodate movement of the airbag 28 due to reaction forces from escaping gases.

The flow director second end 30d may also be releasably closable so as to prevent a flow of inflation gas through the flow director second end 30d into the flow director interior 30f prior to actuation of the vent 30. In one or more arrangements, closure of the flow director second end 30d may be implemented using a cinch mechanism (generally designated 30j) threaded along (or otherwise incorporated into) the flow director second end 30d. The cinch mechanism 30j may incorporate the cable or tether 30h attaching the flow director second end 30d to the flow director securement mechanism 42, and may be configured to close the flow director second end 30*d* when the cable 30*h* is tensioned. Other releasable closing arrangements may also be used.

The design of the cable 30*h* attaching the flow director second end 30*d* to the flow director securement mechanism 42 and the design of the cinch or other mechanism 30*j* securing the flow director second end 30*d* in a closed condition may be adapted to maintain the flow director second end 30*d* in a closed or substantially closed condition when an end of the cable 30*h* is attached to the flow director securement mechanism 42, without unduly restricting inflation of the airbag 28. The flow director 30*b* may be formed from a flexible material (such as a fabric or polymer material) enabling the flow director to rapidly move and reconfigure responsive to pressure exerted by inflation gases when the flow director second end 30*d* is unsecured. The material may be non-porous or substantially non-porous.

Referring to FIGS. 1A-1C, the flow director securement mechanism 42 may be structured to individually releasably secure ends of the cable(s) or tether(s) opposite the ends attached to the flow director(s). For example, the portion of the flow director securement mechanism 42 securing the end of the cable 30*h* may be individually controllable and actuatable by a vent controller 44 and/or by a computing system (such as vehicle computing system 114, described below) to release the attached cable, thereby enabling actuation of a single cushioning surface positioning vent or simultaneous or sequential actuation of multiple cushioning surface positioning vents, in any desired combination.

In one or more arrangements, the flow director securement mechanism 42 may be incorporated into an airbag module 29 including the airbag 28. The airbag module 29 may be structured to permit inflation gases to flow around the flow director securement mechanism 42 and into the airbag interior 28*b*. For example, in the embodiment shown in FIGS. 1A-1C, an inflation gas flow channel 29*a* may be formed between the flow director securement mechanism 42 and the airbag interior 28*b*.

Any suitable method may be used by the flow director securement mechanism 42 to releasably secure the flow director cables, such as cable 30*h* of vent 30. For example, in one or more arrangements, the flow director securement mechanism 42 may incorporate a mechanism configured to cut the cable 30*h* securing the flow director second end 30*d* to the securement mechanism 42, thereby releasing the flow director second end 30*d* to exit the vent opening 30*a* as described herein. In addition, the locations of the vents along the airbag outer shell and the dimensions of the cushioning surface positioning vent features may be varied according to such factors as the degree of estimated reaction force needed to achieve the desired movement of the airbag cushioning surface, space constraints within the vehicle, and other factors.

Flow director securement mechanism 42 may incorporate any of a variety of mechanisms structured to releasably secure one or more tethers (such as tether 30*h*). In one or more arrangements, the tether(s) may be individually or collectively clamped to the flow director securement mechanism 42 with a portion of each tether passing through or along an individually actuatable cutting blade. Each cutting blade may be individually actuatable to cut an associated one of the tethers using, for example, a mechanical blade actuation means or a blade actuation means operable by a pressurized fluid (such as hydraulic oil or pressurized gas generated by a squib or pyrotechnic gas generator). A bank of such mechanisms may be collected into a flow director securement mechanism structure configured for incorporation into an airbag module 29 including the airbag 28, with each mechanism configured to be individually operable responsive to control signals from vent controller 44 and/or from a computing system (such as vehicle computing system 114). Alternatively, the flow director securement mechanism 42 may incorporate individually actuatable clamp release mechanisms instead of tether cutting mechanisms, with each clamp release mechanism being actuatable to release an associated clamped tether responsive to control signals from vent controller 44 and/or from a computing system (such as vehicle computing system 114). Other types of releasable tether securement mechanisms are also possible.

The basic operation of the cushioning surface positioning vent 30 is shown in FIGS. 1A-1C.

A normal position of an airbag cushioning surface within a vehicle may be defined as a position the cushioning surface occupies with the airbag fully inflated and none of the cushioning surface positioning vents actuated. This may be the designed deployment position of the cushioning surface for a user or vehicle occupant seated upright and facing toward the front of the vehicle during a collision scenario, for example. Thus, the normal position of the cushioning surface may be determined by such factors as the size and shape of the airbag, the shape of the vehicle interior, the portion of the occupant's body which the cushioning surface is intended to contact, where the user is seated, effects of gravity on the inflated airbag, and other pertinent design and safety considerations. Actuation of one or more actuatable cushioning surface positioning vents as described herein will move the cushioning surface, to adjust or shift the final deployed position of the cushioning surface in a predetermined and desired manner during and/or after airbag inflation, and prior to contact between the airbag and a user. Thus, instead of the final deployment position of the cushioning surface being the normal position, the final deployment position of the cushioning surface may be an adjusted position offset from the normal position. The adjusted position may be determined or constrained by such factors as the airbag geometry, the geometry of the vehicle interior (for example, the allowable space into which the airbag may shift due to vent reaction forces), the airbag module mounting, and other pertinent factors. These factors may be specified and controlled to some degree to achieve a desired adjusted position of the cushioning surface during airbag inflation.

Referring to FIGS. 1A-1C, an embodiment of the airbag 28 may include a pair of cushioning surface positioning vents 30 and 50, with each vent arranged to move the airbag cushioning surface in respective direction when actuated. Vent 30 is structured to move the airbag cushioning surface in direction D1 when actuated, and vent 50 is structured to move the airbag cushioning surface in direction D2 when actuated. In one or more arrangements, direction D1 may be toward a right side of the occupant/vehicle, and D2 may be toward a left side of the occupant/vehicle opposite direction D1. Vent 50 may have a structure similar to that of vent 30 previously described, and may also operate in the same manner.

The partial cutaway frontal view of airbag 28 in FIG. 1A shows the airbag prior to actuation of any of the cushioning surface positioning vents 30, 50. In the embodiment shown, sensors (not shown) may detect an oblique collision scenario (as described in greater detail below) or another collision scenario in which the normal deployed position of an airbag cushioning surface 28*c* may not align with an expected line of movement of a vehicle occupant after a collision. For example, an estimated post-collision line of motion of the occupant may lie to the right side of a line of motion along which the occupant would normally move to contact the cushioning surface in its normal position. To better align the airbag cushioning surface 28c with a portion of the occupant's body which the airbag 28 is intended to cushion, a vent controller may actuate vent 30 after following the collision and after the airbag 28 is fully inflated, but prior to a user contacting the airbag 28. In the drawings, the ends of the cables (such as cable 130h in FIG. 3C and cables 230h, 232h, 234h in FIG. 6C, for example) not connected to respective flow director second ends may be secured by a securement mechanism (such as flow director securement mechanism 42 as shown in FIGS. 1A-1C, for example) prior to vent actuation.

Actuation of the cushioning surface positioning vent(s) described herein may be performed by cutting or otherwise releasing the cable(s) attached to the respective flow director second end(s) during or after inflation of the airbag. Actuation of vent 30 may operate the flow director securement mechanism 42 to release the cable 30h securing the flow director second end 30d, as shown in FIG. 1B. This permits pressure from airbag inflation gas to force the flow director second end 30d through vent opening 30a and outside the outer shell, as shown in FIG. 1C. Actuation of the vent 30 also releases closure of the flow director second end 30d, permitting inflation gas flowing into the flow director interior 30f through the flow director first end 30c to force open the flow director second end 30d and flow out of the flow director second end 30d, in direction D2. Flow of gases in direction D2 produces a reaction force in the opposite direction D1, thereby moving the cushioning surface in direction D1 toward an adjusted position (shown in solid lines in FIG. 1C). FIG. 1C shows a normal deployment position of the cushioning surface 28c as a dashed line.

One example of a specific application of this operating principle is described with reference to FIGS. 3A-3C. FIG. 3A is a schematic plan view showing an airbag 128 in a deployed or fully inflated state after deployment in a deployment direction DP. The airbag 128 may incorporate a single cushioning surface positioning vent 130 configured in a manner similar to vent 30 previously described, and may have similar element numbers. For example, airbag 128 may include an outer shell 128a defining an interior 128b of the airbag, etc. Airbag 128 is shown as a front airbag which may be deployable to extend from a portion 31 (for example, a dashboard or steering wheel) of a vehicle in which it is installed. FIG. 3B is a schematic frontal view of the inflated airbag 128 shown in FIG. 3A (i.e., a view a seated vehicle occupant would have when facing the deployed airbag) after cushioning surface positioning vent actuation. FIG. 3C is a schematic side perspective view of the airbag 128 shown in FIGS. 3A and 3B prior to cushioning surface positioning vent actuation.

In the embodiment shown, vent 130 may be actuated to move the airbag cushioning surface 128c in a direction D1 as previously described. Thus, when the airbag 128 needs to be deployed, if a head or torso of the user is estimated to move forward to the right side of an optimal envelope for cushioning by the cushioning surface 128c in the normal position, the vent 130 may be actuated to move the cushioning surface 128c toward the user's right side to better align the cushioning surface 128c with the user's projected path of motion after the collision. In an alternative embodiment, the airbag 128 may incorporate more than one cushioning surface positioning vent, with only vent 130 being actuated to move airbag cushioning surface 128c in the desired direction.

Referring now to FIG. 4, in another particular application of the airbag embodiment 128, the cushioning surface positioning vent 130 may be actuated to counter other forces operating on the exterior of the airbag 128, to maintain the cushioning surface 128c in its normal deployment position. In this application, airbag 128 acts as a passenger side front airbag in a vehicle. The vehicle sensors may detect a pending collision scenario which necessitates deployment of both a side airbag 33 and the front airbag 128. Under normal conditions, deployment of the side airbag 33 may create a sideways force in direction D2 on the front airbag 128 during inflation of the airbags, acting to push the cushioning surface 128c of the front airbag 128 toward a left side of the occupant and out of its normal deployment position. However, if a cushioning surface positioning vent (such as vent 30 of FIGS. 1A-1C or vent 130 of FIGS. 3A-3C) is actuated after inflation of the front airbag 128 and before contact between the occupant 49 and the airbag 128, the resulting reaction force F1 in direction D1 may exert a counter-force which moves the cushioning surface 128c back into its normal deployment position against side airbag 33, and/or retains the cushioning surface 128c in its normal deployment position during impact by the occupant 49.

Figure 5B:
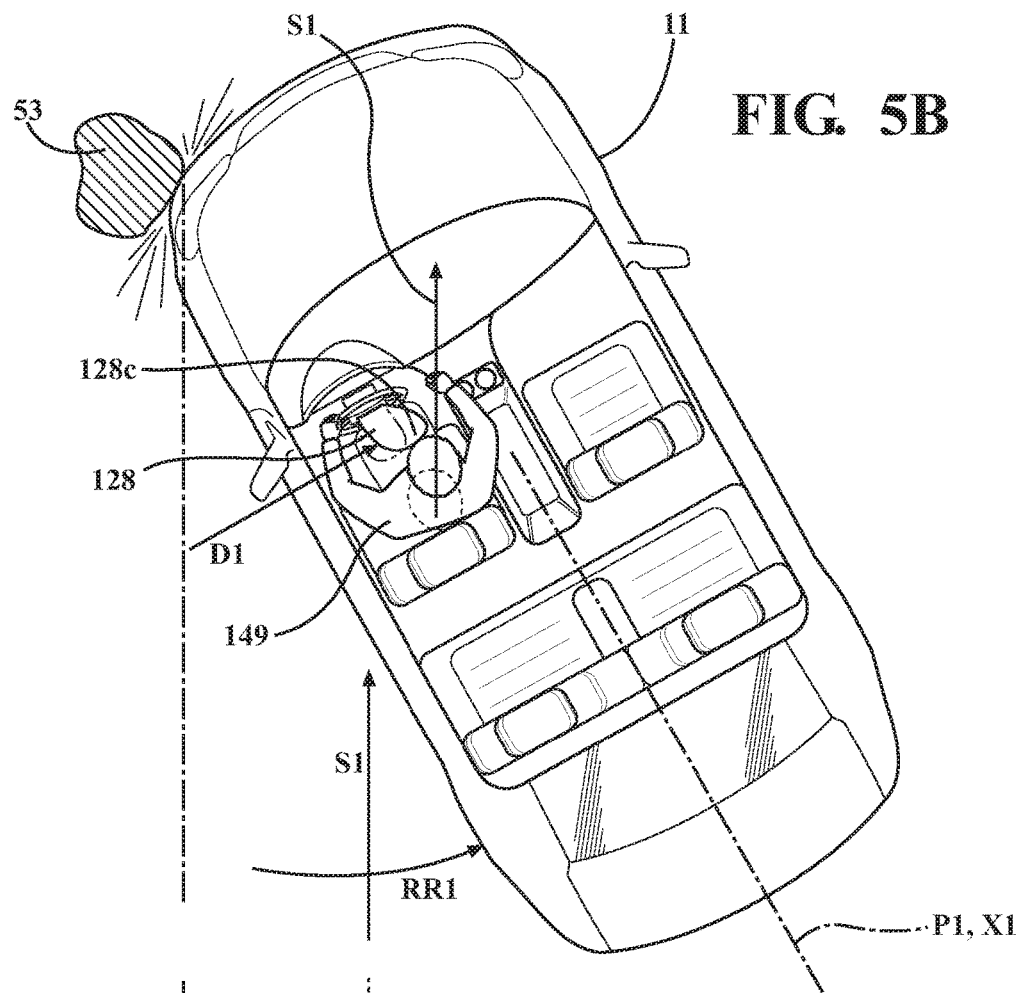
FIG. 5B is the schematic plan view of a FIG. 5A, showing the vehicle after deployment of the airbag and after actuation of a cushioning surface positioning vent in accordance with an embodiment described herein.
Figure 5A:
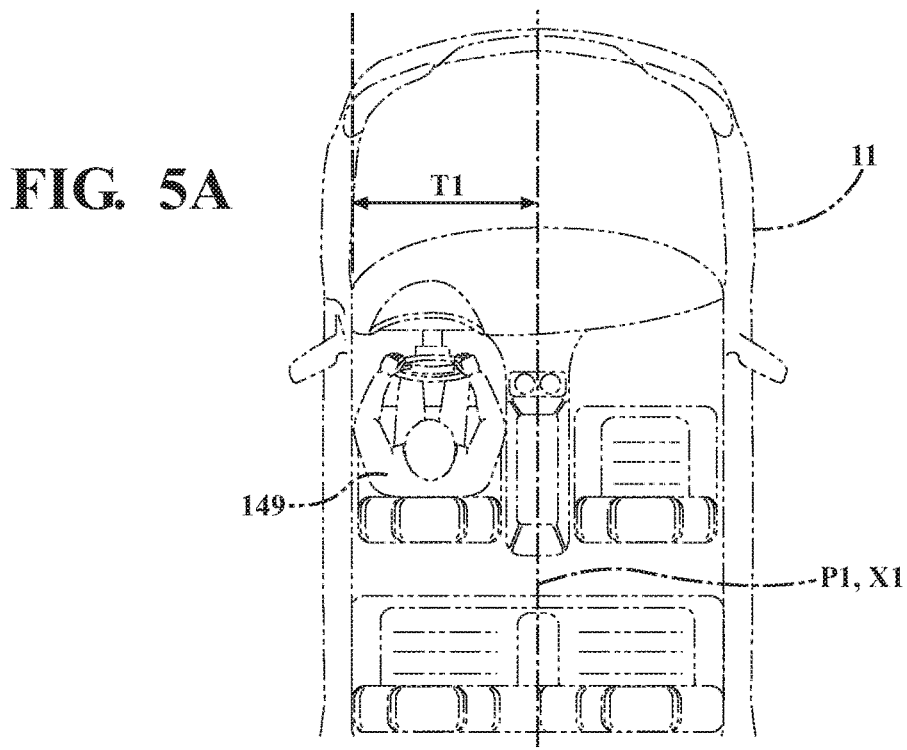
FIG. 5A is a schematic plan view of a vehicle incorporating the airbag of FIGS. 3A-3C in another particular application of the airbag, prior to airbag deployment.

Another particular application of the airbag embodiment 128 is shown in FIGS. 5A-5B. FIG. 5A shows a first location of a vehicle 11 (indicated by dashed lines) traveling in direction S1, and FIG. 5B shows a second, subsequent location of the vehicle 11 (shown in solid lines). In the first location of the vehicle 11, the vehicle is approaching an object 53 such as tree or post. In the second location of the vehicle 11, the vehicle has just collided with the post 53 in an oblique collision scenario.

For purposes of description, the vehicle fore-aft axis X1 may extend along a vertical plane P1 passing through a center of mass of the vehicle 11, and parallel to a road surface on which the vehicle resides. The vehicle fore-aft axis X1 indicates reference forward and reverse directions of the vehicle when the vehicle wheels are straight (pointed at a 0° turning angle). An oblique collision scenario of the vehicle may be a collision which tends to rotate the vehicle with respect to a vertical axis extending perpendicular to the fore-aft axis of the vehicle, for example in direction RR1 as shown in FIG. 5B. An oblique collision scenario may occur, for example, when the vertical plane P1 along which the vehicle moves in direction S1 as it approaches the object 53 is offset from another vertical plane P2 extending parallel to the vertical plane P1 and through an estimated point of contact of the vehicle 11 with the object 53. Due to this offset T1, the momentum of the vehicle tends to rotate the vehicle in direction RR1 after collision.

In this scenario, airbag 128 may deploy from the steering wheel or dash board in its normal fashion (as indicated by a dashed line), toward a vehicle occupant 149 and in a direction generally parallel to the vehicle fore-aft axis X1. However, due to the occupant's momentum in direction S1, the occupant 149 may tend to keep moving forward in direction S1, which forms an acute angle with respect to the deployment direction of the airbag 128. Thus, the airbag cushioning surface 128c may not be favorably aligned with the occupant's direction of motion D3. However, when the probability of such an oblique collision scenario is detected by sensors, the cushioning surface positioning vent 130 may be actuated to force the airbag cushioning surface 128c in the direction D1 as described with respect to FIGS. 1A-1C and as shown in FIG. 5B. This may move the airbag cushioning surface 128c toward a right side of the occupant (as indicated by the solid line in FIG. 5B), and into better alignment with the occupant's line of motion S1, thereby facilitating cushioning of the occupant.

A prospective oblique collision scenario may be detected by vehicle sensors in any of a variety of known ways. For example, a vehicle computing system may be configured to process vehicle sensor information such as vehicle frontal cross-sectional area, object cross-sectional area in the direction of approach S1, vehicle velocity relative to the object, a known location of the plane P1, road conditions, and other pertinent information which may be used to estimate such parameters as a location at which the vehicle will contact the object, the degree to which the expected collision may tend to rotate the vehicle, and the direction of motion of the occupant's body/head/torso with respect to the normal deployment direction of the airbag after collision. This may enable a suitable cushioning surface positioning vent to be actuated to move the cushioning surface in a direction to align with the expected motion of the occupant. In a similar manner, characteristics of other types of off-center collisions and collisions from unexpected directions may be detected by sensors and the information used to actuate one or more cushioning surface positioning vents to adjust the position of the airbag cushioning surface so as to align the surface with an expected line of motion of an occupant.

The drawings also show additional embodiments of airbags with various possible locations of actuatable cushioning surface positioning vents. Actuation of one or more actuatable cushioning surface positioning vents as described herein acts to move the airbag cushioning surface in a direction (or into a position) more favorable for cushioning the user, based on the user's position and estimated line of motion at the time of airbag/vent actuation. As stated previously, an embodiment of the airbag may include a plurality of cushioning surface positioning vents coupled to the cushioning surface. Each cushioning surface positioning vent of the plurality of cushioning surface positioning vents may be actuatable to direct an associated flow of gas exiting the interior of the airbag so as to produce an associated reaction force which moves the cushioning surface in an associated predetermined direction. For example, the airbag embodiment shown in FIGS. 1A-1C may be configured and installed in a vehicle to enable selective movement of the cushioning surface toward a left side or a right side of the occupant/vehicle. If it is estimated that the occupant will move forward to the left side of an optimal envelope for cushioning by the airbag cushioning surface 28c in the normal position, vent 50 may be actuated to move the cushioning surface toward the user's left side to better align the cushioning surface with the user's projected path of motion after the collision.

Figure 6A:
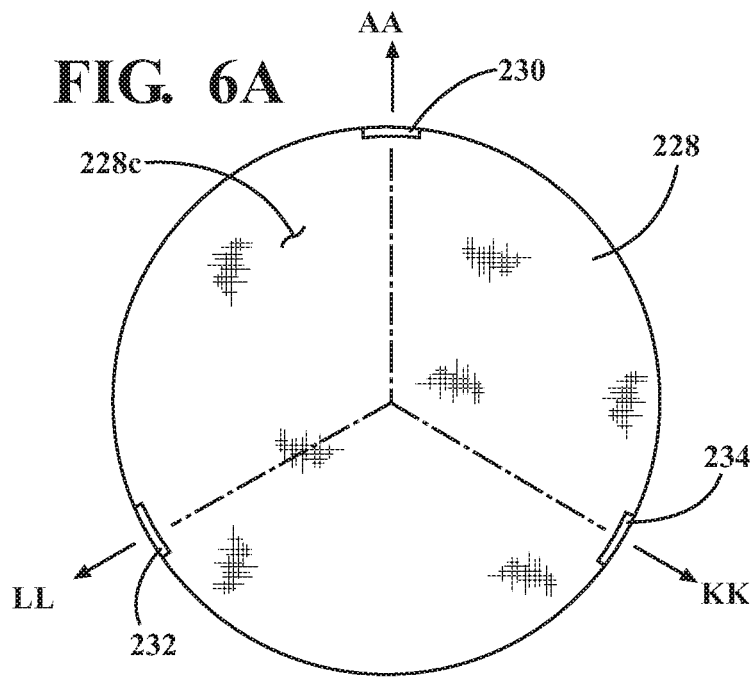
FIG. 6A is a schematic front view of an airbag in accordance with another embodiment described herein.
Figure 6B:
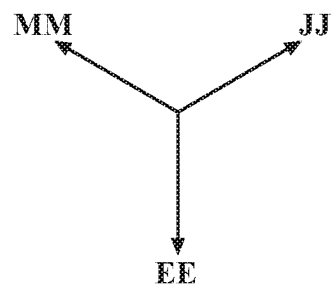
FIG. 6B shows directions of reaction forces provided by gas flow from the cushioning surface positioning vents shown in FIG. 6A.
Figure 6C:
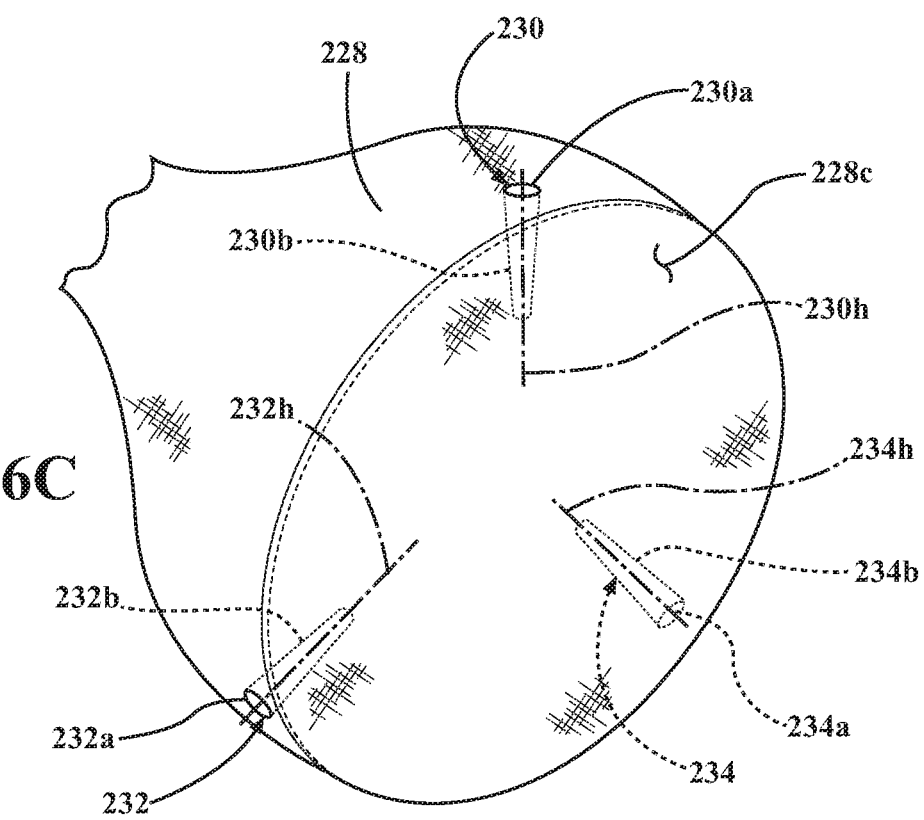
FIG. 6C is a schematic perspective view of the airbag shown in FIG. 6A, and prior to actuation of any cushioning surface positioning vents.

FIG. 6A is a schematic front view of an airbag 228 in accordance with another embodiment described herein. FIG. 6B shows directions of reaction forces provided by gas flow from the vents shown in FIG. 6A. FIG. 6C is a schematic perspective view of the airbag shown in FIG. 6A, prior to actuation of any cushioning surface positioning vents. Referring to FIGS. 6A-6C, the airbag 228 may include an arrangement of three actuatable cushioning surface positioning vents 230, 232, 234 along the airbag outer shell 228a. The actuatable cushioning surface positioning vents 230, 232, 234 may be positioned so as to have an angular separation of about 120°. The vents 230, 232, 234 may be structured in the same manner as vent 30 shown in FIGS. 1A-1C.

Gases exiting the vents may flow from vent 230 in direction AA (i.e., upwardly), from vent 232 in direction LL, and from vent 234 in direction KK. Consequently, referring to FIG. 6B, gases flowing from vent 230 may produce a reaction force in direction EE (i.e. downward), gases flowing from vent 232 may produce a reaction force in direction JJ (i.e., opposite direction LL), and gases flowing from vent 234 may produce a reaction force in direction MM.

In one or more arrangements, combinations of cushioning surface positioning vents may be actuated to move the cushioning surface in a desired direction or toward a desired position. For example, referring again to FIGS. 6A-6B, the plurality of actuatable cushioning surface positioning vents 230, 232, 234 may be configured such that actuation of a first vent produces a first reaction force tending to move the cushioning surface in a first predetermined direction, and actuation of a second vent produces a second reaction force tending to move the cushioning surface in a second predetermined direction different from the first predetermined direction. In addition, a combination of the first reaction force and the second reaction force may act to move the cushioning surface in a third predetermined direction. The third predetermined direction may be a vector sum of the first direction and the second direction.

Thus, for example, simultaneous actuation of vents 230 and 234 may produce a resultant force (the vector sum of reaction forces in directions EE and MM) which moves the cushioning surface in direction LL. Similarly, simultaneous actuation of vents 230 and 232 may produce a resultant force (the vector sum of reaction forces in directions EE and JJ) which moves the cushioning surface in direction KK. Also, simultaneous actuation of vents 234 and 232 may produce a resultant force (the vector sum of reaction forces in directions MM and JJ) which moves the cushioning surface in direction AA.

The ability to actuate multiple vents simultaneously enables a greater degree of control over the movement and positions of the cushioning surface. The vent arrangement shown in FIGS. 6A-6C may enable movement of the cushioning surface in directions angularly spaced apart at 60° intervals, by actuating individual vents or suitable combinations of vents.

A similar type of vent arrangement is shown in FIGS. 7A-7B. FIG. 7A is a schematic front view of an airbag in accordance with another embodiment described herein. FIG. 7B shows directions of reaction forces provided by gas flows from the cushioning surface positioning vents shown in FIG. 7A. The airbag 328 of FIGS. 7A-7B includes an arrangement of four individually actuatable cushioning surface positioning vents 330, 332, 334, and 336 disposed along the airbag outer shell 328a. The cushioning surface positioning vents 330, 332, 334, and 336 may be positioned so as to have an angular separation of about 90°. Gases exiting these vents may flow from vent 330 in direction AA (i.e., upwardly), from vent 332 in direction CC (i.e., toward a right side of a user facing the airbag), from vent 334 in direction EE (i.e., downwardly), and from vent 336 in direction GG (i.e., toward a left side of a user facing the airbag). Consequently, as seen from FIG. 7A, gases flowing from vent 330 may produce a reaction force in direction EE (i.e. downward), gases flowing from vent 332 may produce a reaction force in direction GG, gases flowing from vent 334 may produce a reaction force in direction AA, and gases flowing from vent 336 may produce a reaction force in direction CC.

In addition, referring to FIG. 7B, simultaneous actuation of vents 330 and 332 may produce a resultant force (the vector sum of reaction forces in directions EE and GG) which moves the cushioning surface in direction FF. Similarly, simultaneous actuation of vents 332 and 334 may produce a resultant force (the vector sum of reaction forces in directions GG and AA) which moves the cushioning surface in direction HH. Also, simultaneous actuation of vents 334 and 336 may produce a resultant force (the vector sum of reaction forces in directions AA and CC) which moves the cushioning surface in direction BB. Also, simultaneous actuation of vents 330 and 336 may produce a resultant force (the vector sum of reaction forces in directions CC and EE) which moves the cushioning surface in direction DD. The vent arrangement shown in FIGS. 7A-7B enables movement of the cushioning surface in directions spaced apart at 45° intervals, by actuating individual vents or suitable combinations of vents.

Thus, it may be seen that providing multiple, independently actuatable cushioning positioning vents arranged at suitable locations along the airbag outer shell may provide greater flexibility in controlling the direction of movement of the cushioning surface.

Figure 8:
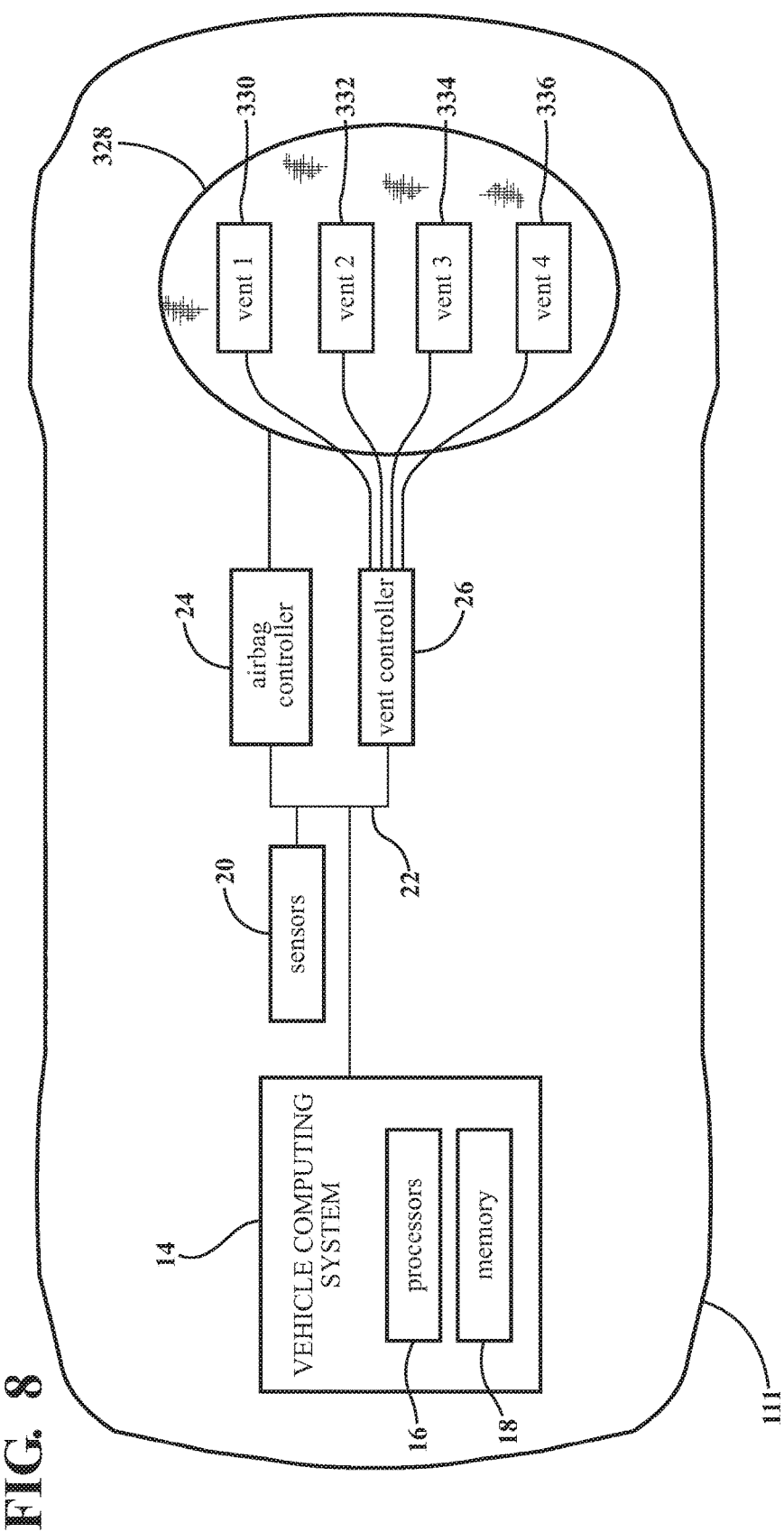
FIG. 8 is a functional block diagram illustrating an exemplary vehicle incorporating an airbag in accordance with an embodiment described herein.

FIG. 8 is a functional block diagram illustrating an exemplary vehicle 111 incorporating an airbag in accordance with an embodiment described herein. The vehicle 111 may take the form of a car, truck, or other vehicle. The vehicle 111 may be configured to operate in manual mode, or fully or partially in an autonomous mode. In an autonomous mode, the vehicle 111 may be configured to operate without human interaction. For purposes of description, vehicle 111 incorporates an airbag embodiment configured as shown in FIGS. 7A-7B, with four individually-actuatable cushioning surface positioning vents 330, 332, 334, and 336. However, the airbag may alternatively include different numbers and arrangements of cushioning surface positioning vents.

The vehicle 111 may include various systems, subsystems and components in operative communication with each other, such as a sensor system or array 20, a vehicle computing system 14, an airbag controller 24, an actuatable cushioning surface positioning vent controller 26, and one or more airbags (such as airbag 328) including one or more associated actuatable cushioning surface positioning vent(s) as described herein. Systems and elements of the vehicle 111 may communicate over a suitable network or bus 22.

The vehicle computing system 14 may be operatively connected to the other vehicle systems and elements and may be configured so as to control and operate the vehicle 111 and its components. The computing system 14 may be configured to control at least some systems and/or components autonomously or automatically (without user input) and/or semi-autonomously (with some degree of user input). The computing system 14 may also be configured to control and/or execute certain functions autonomously and/or semi-autonomously. The computing system 14 may additionally or alternatively include components other than those shown and described. The computing system 14 may control the functioning of the vehicle 111 based on inputs and/or information received from various sensors of the sensor system 20.

The computing system 14 may include one or more processors 16 (which could include at least one microprocessor) for controlling overall operation of the computing system 14 and associated components, and which execute instructions stored in a non-transitory computer readable medium, such as the memory 18. "Processor" means any component or group of components that are configured to execute any of the processes and/or process steps described herein or any form of instructions to carry out such processes/process steps or cause such processes/process steps to be performed. The processor(s) 16 may be implemented with one or more general-purpose and/or one or more special-purpose processors. The processor(s) 16 can include at least one hardware circuit (e.g., an integrated circuit) configured to carry out instructions contained in program code. In arrangements in which there is a plurality of processors 16, such processors can work independently from each other or one or more processors can work in combination with each other. In one or more arrangements, the processor(s) 16 can be a main processor of the vehicle 111. For instance, the processor(s) 16 can be part of a vehicle electronic control unit (ECU).

The memory 18 may comprise one or more computer-readable memories. A computer-readable storage or memory 18 includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. The memory 18 can be a component of the computing system 14, or the memory can be operatively connected to the computing system 14 for use thereby. The term "operatively connected," as used throughout this description, can include direct or indirect connections, including connections without direct physical contact.

The memory 18 may contain data and/or instructions (e.g., program logic) executable by the processor(s) 16 to execute various functions of the vehicle 111. The memory 18 may contain additional instructions as well, including instructions to transmit data to, receive data from, interact with, or control one or more of the vehicle systems and/or components described herein.

Vehicle sensor system 20 may be in operative communication with computing system 14, vent controller 26, airbag controller 24 and other vehicle systems and components. Computing system 14, vent controller 26, and/or airbag controller 24 may be configured to control operation of the various vehicle airbags and cushioning surface positioning vents in a manner described herein, responsive to information received from the sensor system 20. In a known manner, the sensor system 20 includes sensors configured to provide data usable by the computing system 14 in formulating and executing suitable control commands for the various vehicle systems. In arrangements in which the sensor system 20 includes a plurality of sensors, the sensors can work independently from each other.

Sensor system 20 may be designed to monitor various vehicle operational parameters, such as mechanical, electrical, fluidic, and other parameters. Sensor system 20 may be also designed to monitor various and also various environmental conditions both inside and external to the vehicle. Sensor system 20 may also include one or more pre-collision or pre-crash sensors configured to alert the computing system to vehicle external conditions which indicate that a collision is imminent or probable. The vehicle sensors provide data used by the computing system and/or controllers 24, 26 in formulating and executing control commands for airbag actuation and cushioning surface positioning vent actuation as described herein. Sensor system 20 may include radar and lidar systems, laser scanners, vision/camera systems, GPS systems, various inertial sensors such as gyroscopes and accelerometers, vehicle wheel speed sensors, road condition sensors, suspension height sensors, steering angle sensors, steering torque sensors, brake pressure sensors, accelerator or pedal position sensor, and tire pressure sensors, and/or any other sensors usable to detect and/or estimate characteristics of the vehicle 111 and the environment, including any object(s) with which the vehicle 111 may collide.

Airbag controller 24 may be configured to control deployment of the vehicle airbags in a known manner. A dedicated cushioning surface positioning vent controller 26 may be provided for actuating any of the cushioning surface positioning vents 330, 332, 334, 336 responsive to inputs and/or information received from various sensors of the sensor system 20. In one or more arrangements, the vent controller 26 may include one or more processor(s), one or more memories and any other elements (in the form of hardware and/or software) needed to process sensors data and other information, and to determine whether one or more of the cushioning surface positioning vents 330, 332, 334, 336 should be activated. For example, as described herein, the cushioning surface positioning vent controller 26 may receive and analyze information relating to a pending collision and determine a projected line of motion of a vehicle occupant due to the collision. The controller may then determine which cushioning surface positioning vent(s) are to be actuated and control operation of the vehicle to actuate the cushioning surface positioning vent(s) at an appropriate time. Alternatively, the vehicle computing system 14 may perform one or more of these functions in conjunction with the vent controller. In another alternative embodiment, the vehicle computing system 14 may be configured to perform all of the vent controller functions described herein, thereby eliminating the need for the vent controller. In yet another embodiment, the airbag controller 24 may be configured to perform all the control functions of the vent controller 26.

In operation, referring to FIG. 8, sensors 20 may detect information relating to the vehicle environment and other parameters, as previously described. The detected sensor information (or portions of the detected information, for example, from specific sensors) may be forwarded to controllers 24, 26 and/or to computing system 14. Analysis of the detected sensor information may indicate a condition in which an airbag (such as airbag 328) needs to be deployed. Analysis of the detected sensor information may also indicate a condition in which one or more of cushioning surface positioning vents 330, 332, 334, 336 should be activated to move a cushioning surface of the airbag into better alignment with a projected line of motion of a vehicle occupant, based on an anticipated collision scenario. Vent controller 26 may actuate one or more of vents 330, 332, 334, 336 as needed after the airbag is inflated but prior to a predicted time when the vehicle occupant will contact the airbag cushioning surface.

Figure 9:
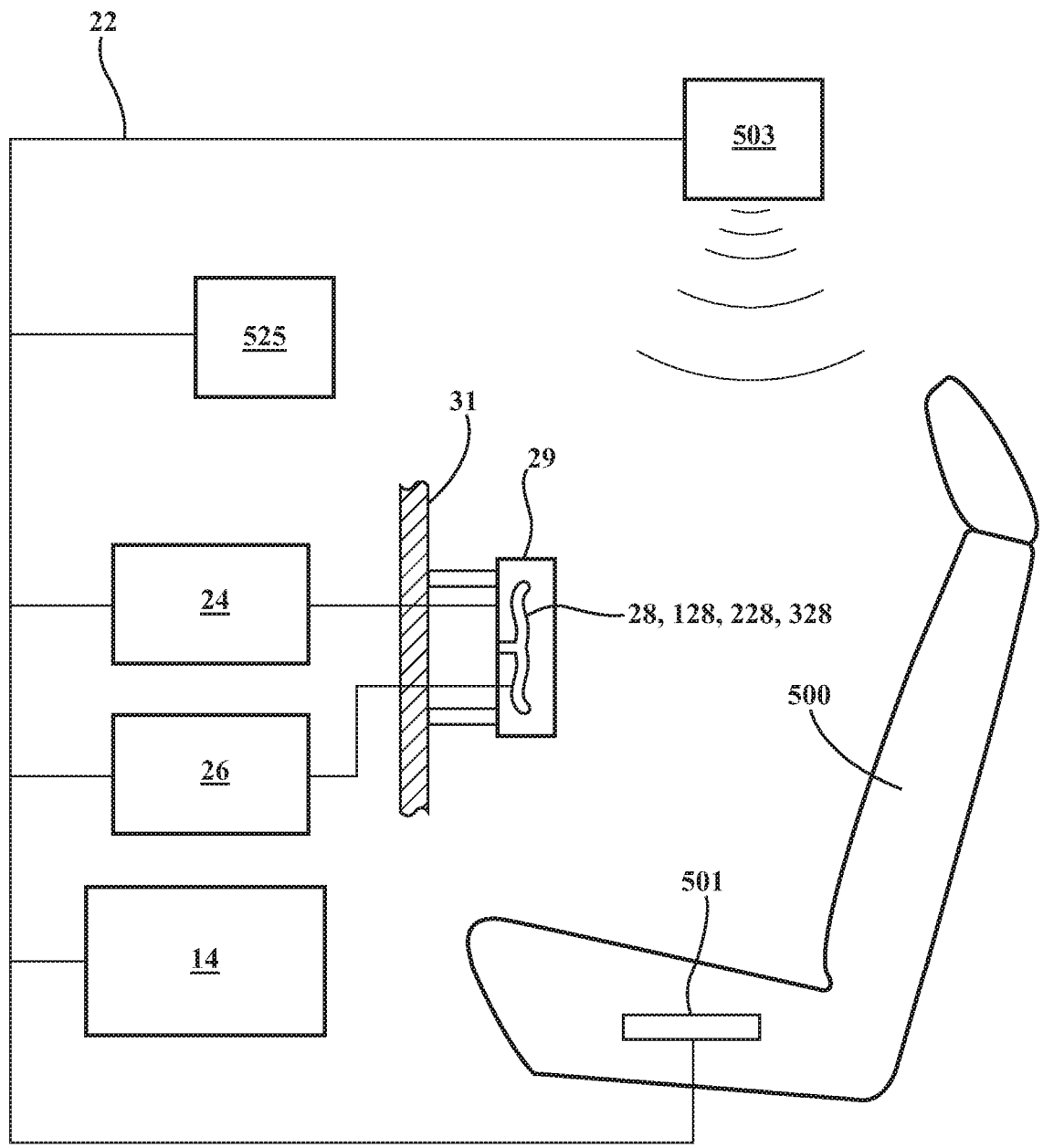
FIG. 9 is a schematic block diagram showing one embodiment of a sensor arrangement configured for measuring one or more vehicle occupant parameters.

FIG. 9 is a schematic block diagram showing one embodiment of a sensor arrangement configured for measuring one or more vehicle occupant parameters. Referring to FIG. 9, sensor system 20 may include one or more sensors operable to obtain data which may be used (by computing system 14 and/or controllers 24, 26) to determine values for various vehicle occupant parameters relating to an occupant of the vehicle. The values of these parameters may be used to control operation of the airbag and/or operation of the actuatable cushioning surface positioning vents described herein. The vehicle occupant parameters may include occupant weight, height, locations of the occupant's head, torso, or other body portion(s), a direction in which the occupant is leaning, and other parameters. Because these parameters may change unpredictably and relatively rapidly, the sensors 20 and the computing system 14 may continuously gather and process data relating to the parameters, so that the vehicle occupant parameter values may be updated as rapidly as possible. The use of "continuously" when referring to the reception, gathering, monitoring, processing, and/or determination of any information or parameters described herein means that the computing system 14 may be configured to receive and/or process any information relating to these parameters as soon as the information exists or is detected, or as soon as possible in accordance with sensor acquisition and processor processing cycles.

Types of sensors used may include weight (e.g., pressure) sensors (such as weight sensor 501 mounted in vehicle seat 500), body portion positional sensors 503, one or more cameras 525, and/or sensors for measuring other characteristics or conditions. Vehicle occupant parameters determined using the sensor data may be provided to the computing system 14, airbag controller 24 and/or to vent controller 26 controlling the airbag(s) and their associated cushioning surface positioning vents, for using in generating control signals for operation of the airbags and vents. For example, information from the sensors 20 may be used to predict a line of motion of the occupant after a pending or anticipated collision occurs.

As an example, referring to FIG. 9, the vehicle 111 may incorporate one or more body portion positional sensors 503. The body portion positional sensor(s) 503 may be disposed in the roof of the vehicle or in another suitable location. In one or more arrangements, the sensor(s) may be an ultrasonic sensor configured to measure a position of the occupant's head with respect to the sensor. The sensor(s) 503 may also measure a direction of the occupant's head with respect to the sensor(s). The sensor(s) 503 may alternatively gather data from which these parameters may be determined. The body portion positional sensor(s) 503 may send a signal to the computing system 14 and/or to controllers 24 and 26 containing the gathered information or any parameter values determined. In other embodiments, the body portion positional sensor(s) 503 may be one or more capacitive or laser sensors. Those skilled in the art may recognize that additional types of sensors may also be used, either alone or in combination with other sensors. In addition, the computing system 14 and controllers 24, 26 may use information received from any combination of sensors in sensor system 20 and also information from any other source in determining the values of the vehicle occupant parameters.

Figure 10:
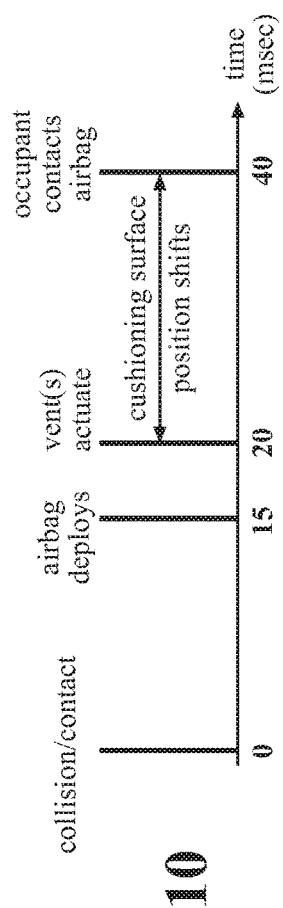
FIG. 10 shows one embodiment of a timeline governing actuation of cushioning surface positioning vents as described herein.

FIG. 10 shows one embodiment of a timeline governing actuation of the actuatable cushioning surface positioning vents described herein. The timeline shown is for an airbag in a vehicle application. At time t=0, a collision event occurs necessitating actuation of an airbag incorporating an actuatable vent as described herein. After about 15 milliseconds after the airbag deployment signal is given, the airbag deploys. The airbag is at or near full inflation (at about 20 milliseconds) when any necessary cushioning surface positioning vent(s) are actuated. This helps ensure sufficient gas pressure for the positioning vent flow directors to move the portion of the airbag including the cushioning surface in the desired direction and/or to the desired adjusted position. Also, the cushioning surface positioning vent(s) are actuated with sufficient lead time to move the cushioning surface in the desired directions and/or to the desired adjusted position prior to contact of a user with the airbag. After actuation of the cushioning surface positioning vent(s), the position of the cushioning surface moves responsive to the generated reaction forces, and prior to contact of the user with the airbag. The occupant may contact the airbag at about 40 milliseconds after collision.

It should be understood that the preceding is merely a detailed description of various embodiments of this invention and that numerous changes to the disclosed embodiments can be made in accordance with the disclosure herein without departing from the spirit or scope of the invention. Thus, the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle airbag system comprising:
an airbag including a cushioning surface configured to be contacted by a user to cushion the user after inflation of the airbag, the airbag including:
a neck portion at a junction between the airbag and a portion of a vehicle from which the airbag deploys;
a connecting portion extending from the neck portion between the neck portion and the cushioning surface, the connecting portion being structured to be spaced apart from any other portion of the vehicle when the airbag is deployed, the connecting portion being structured so that the entire cushioning surface is unitarily movable side to side with respect to the neck portion; and
at least one cushioning surface positioning vent coupled to the cushioning surface, wherein the at least one cushioning surface positioning vent is actuatable by a vent controller responsive to collision-related sensor data to direct a flow of gas exiting an interior of the airbag so as to produce a reaction force, and wherein the airbag is structured so as to, when inflated, extend from the portion of the vehicle in which it installed so as to enable the reaction force to move the entire cushioning surface in a predetermined direction substantially perpendicular to a deployment direction of the airbag.

2. The vehicle airbag system of claim 1 wherein the airbag has an outer shell, and wherein the at least one cushioning surface positioning vent comprises:
a vent opening formed in the outer shell and structured to enable the flow of gas from the interior of the airbag to an exterior of the airbag; and
a flow director structured to extend outside the outer shell after actuation of the at least one cushioning surface positioning vent, to direct the flow of gas in another predetermined direction different from the predetermined direction and directed to producing the reaction force.

3. The vehicle airbag system of claim 2 wherein the flow director comprises:
a first end;
a second end opposite the first end; and
a tubular body extending between the first end and the second end and defining an interior of the flow director, an edge of the first end being coupled to the airbag outer shell surrounding the vent opening so as to form a substantially gas-tight seal between the flow director first end and the airbag outer shell.

4. The vehicle airbag system of claim 3 wherein the flow director second end is structured to be releasably securable inside the airbag prior to actuation of the at least one cushioning surface positioning vent.

5. The vehicle airbag system of claim 4 wherein the flow director second end is structured to be releasably closable so as to prevent a flow of inflation gas through the flow director second end into the flow director interior prior to actuation of the at least one cushioning surface positioning vent.

6. The vehicle airbag system of claim 5 wherein the flow director is structured so that actuation of the at least one cushioning surface positioning vent releases securement of the flow director second end, permitting pressure from airbag inflation gas to force the flow director second end through vent opening and outside the outer shell, and wherein actuation of the at least one cushioning surface positioning vent releases closure of the flow director second end, permitting inflation gas flowing into the flow director interior through the flow director first end to flow out of the flow director second end.

7. The vehicle airbag system of claim 1 wherein the system is structured so that the at least one cushioning surface positioning vent is actuatable to direct the flow of gas exiting the interior of the airbag so as to produce a reaction force which moves the entire cushioning surface prior to contact of a user with the airbag.

8. The vehicle airbag system of claim 1 comprising only one cushioning surface positioning vent coupled to the cushioning surface and wherein the single cushioning surface positioning vent is structured to be actuatable to direct the flow of gas exiting the interior of the airbag so as to produce the reaction force which moves the entire cushioning surface in the predetermined direction.

9. The vehicle airbag system of claim 1 wherein the predetermined direction is a direction toward a left side of the vehicle.

10. The vehicle airbag system of claim 1 wherein the predetermined direction is a direction toward a right side of the vehicle.

11. The vehicle airbag system of claim 1 wherein the predetermined direction is an upward direction.

12. The vehicle airbag system of claim 1 wherein the predetermined direction is a downward direction.

13. The vehicle airbag system of claim 1 wherein the predetermined direction is toward an estimated post-collision line of motion of a vehicle occupant.

14. The vehicle airbag system of claim 1 wherein the reaction force tends to move the entire cushioning surface in a predetermined direction directed to maintaining the entire cushioning surface in a normal deployment position of the airbag against another force operating on an exterior of the airbag and tending to move the airbag out of the normal deployment position.

15. A vehicle airbag system comprising:
an airbag including a cushioning surface configured to be contacted by a user to cushion the user after inflation of the airbag, the airbag including:
a neck portion at a junction between the airbag and a portion of a vehicle from which the airbag deploys;
a connecting portion extending between the neck portion and the cushioning surface , the connecting portion being structured to be spaced apart from any other portion of the vehicle when the airbag is deployed, the connecting portion being structured so that the entire cushioning surface is unitarily movable side to side with respect to the neck portion; and
a plurality of cushioning surface positioning vents coupled to the cushioning surface, each cushioning surface positioning vent of the plurality of cushioning surface positioning vents being actuatable to direct an associated flow of gas exiting the interior of the airbag so as to produce an associated reaction force,
wherein the plurality of cushioning surface positioning vents are configured such that actuation of a first cushioning surface positioning vent of the plurality of cushioning surface positioning vents produces a first reaction force tending to move the entire cushioning surface in a first predetermined direction, wherein actuation of a second cushioning surface positioning vent of the plurality of cushioning surface positioning vents produces a second reaction force tending to move the entire cushioning surface in a second predetermined direction different from the first predetermined direction, and wherein a combination of the first reaction force and the second reaction force operates to move the entire cushioning surface in a third predetermined direction, the third predetermined direction being a vector sum of the first predetermined direction and the second predetermined direction.

* * * * *